Oct. 1, 1940.          R. D. ELLIOTT          2,216,340
ELECTRIC CABLE
Filed June 25, 1937
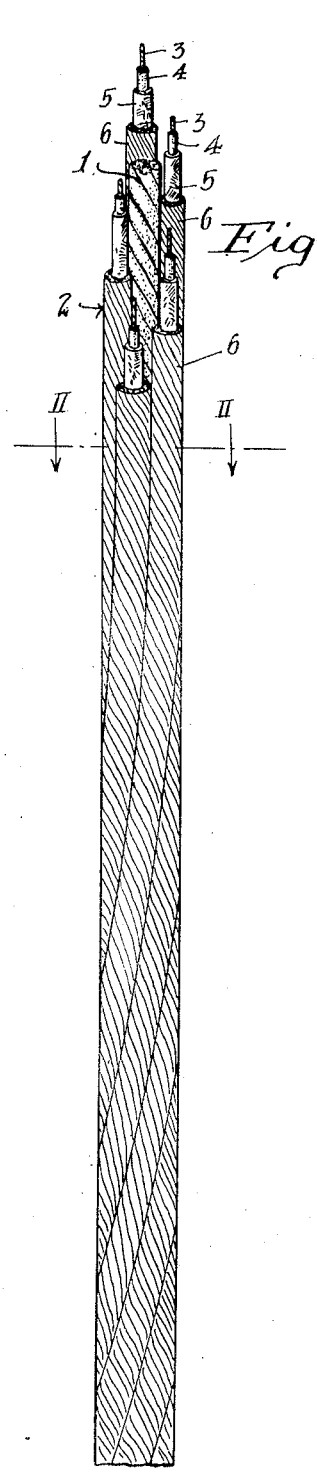
Fig. 1
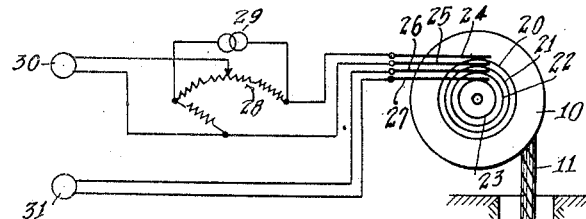
Fig. 3
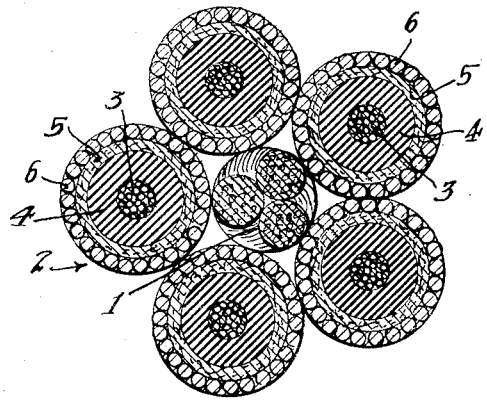
Fig. 2
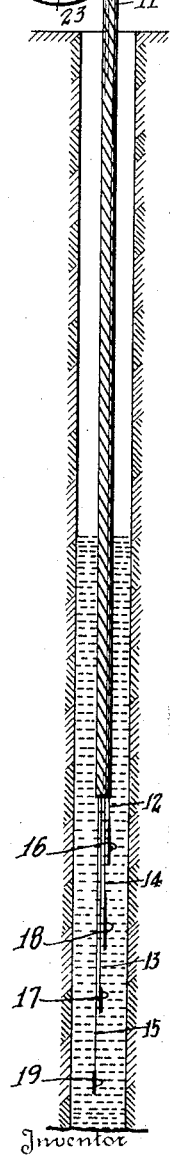
Inventor
Raymond D. Elliott
By Lyon+Lyon
Attorneys Patented Oct. 1, 1940

2,216,340

UNITED STATES PATENT OFFICE 2,216,340

ELECTRIC CABLE

Raymond D. Elliott, Long Beach, Calif., assignor to Lane-Wells Company, Los Angeles, Calif., a corporation of Delaware Application June 25, 1937, Serial No. 150,353

2 Claims. (Cl. 174—103)

This invention relates to electric cables and more specifically to multi-conductor cables adapted to withstand substantial tensile strain and be repeatedly wound and unwound from a winch, or the like.

The invention is particularly useful in electrical exploration of oil wells, in which electrodes are lowered and raised in well-holes filled with fluid, by suspending them on the end of a cable which is unwound from and rewound on a winch, the electrodes being connected through the cable conductors to electrical measuring apparatus at the surface.

Cables heretofore known to me have not been entirely satisfactory for this purpose for the reasons that they have had a relatively short life because of failure of the insulation, or of the electrical conductors, and/or because of varying impedance characteristics when the cable is being wound on or unwound from a winch.

An object of the invention is to provide a multi-conductor cable that is mechanically strong and resistant against abrasive action, and tensile bending and crushing forces, both with respect to maintenance of satisfactory insulation between the electrical conductors and maintenance of continuity of the conductors.

Another object is to provide a multi-conductor cable, the impedance characteristics of which vary only to very slight extent as the cable is wound onto or unwound from a winch.

The invention will now be explained by describing a specific embodiment thereof in detail with reference to the drawing, in which:

Fig. 1 is a side view of a cable in accordance with the invention;

Fig. 2 is an enlarged detail cross section through the cable, taken at II—II of Figure 1; and Fig. 3 is a schematic diagram illustrating a manner of employing a cable in accordance with the invention for making electrical measurements in a drill-hole.

Referring to Figs. 1 and 2 of the drawing, the cable therein depicted comprises a central core element 1 surrounded by five identical cable elements 2 laid around the core 1 with a slight twist as is common in the construction of cables and ropes.

The core element 1 is preferably of some resilient material and may consist of ordinary rope of hemp or other suitable material, which may be impregnated with some suitable preservative to increase its life when alternately wetted and dried. This core 1 serves as a base for separating the outer cable elements 2 and increasing the flexibility of the cable.

Each of the outer elements 2 comprises a central conductor 3 which may consist of a large number of strands of copper wire surrounded by a relatively thick layer of plastic insulating material 4, such as rubber, which forms a continuous coating about the conductor 3 to maintain the insulation of the latter even when the cable is submerged in water or other more or less conductive liquid.

The insulation 4 is in turn preferably enclosed in a sheathing 5 of a suitable fabric which is mechanically strong and serves to protect the insulating material 4 from abrasion by the surrounding armor wires, next to be described.

The armor wires referred to are indicated at 6 in the drawing, and are laid around the fabric 5 in a continuous single layer completely about the element 4. The wires 6 are preferably given a slight twist or lay in a direction opposite to the twist or lay of the individual elements 2 about the core 1. The armors 6 are preferably constructed of some strong wear-resistant metal or alloy, such as steel, so that they are capable of withstanding substantial tensile strain and considerable abrasion without appreciable wear.

In a cable constructed as described, in which the inner electrical conductor 3 of each element 2 is formed of relatively ductile material, such as copper, and the exterior armor wires 6 are formed of a much stronger material and have an aggregate cross section much greater than that of the conductor 3, it is substantially impossible to stretch the conductor 3 sufficiently to pull it apart. This insures that the electrical conductors 3 will remain intact despite the application of relatively great tensile forces to the cable.

The conductors 3 also retain their insulation despite severe service conditions by virtue of the fact that the insulation material is thoroughly protected from abrasive forces by the enclosing ring of armor wire 6. It is also found that the insulation remains intact despite repeated bending strains and crushing forces applied to the cable.

By virtue of the fact that the armor wires 6 are arranged in a continuous layer completely surrounding each electrical conductor 3, the conductors are very thoroughly individually shielded electrically from each other, the magnetic field of each conductor when it is carrying current being substantially limited to the space within the ring or armor wires 6 surrounding that conductor. As a result of this thorough shielding the inductance of each conductor remains substantially constant irrespective of whether the cable is stretched out straight, as when it is suspended from one end in a drill-hole, or whether it is wound in a coil on a winch or spool. As is well-known, the inductance of an ordinary electric cable conductor is greatly increased when the cable is wound on a spool by virtue of the fact that the magnetic field surrounding the different turns of the cable on the spool interlink to substantially increase the strength of the magnetic flux surrounding each turn of the conductor.

This property of my cable of having substantially constant inductance regardless of whether the cable is suspended straight or is wound upon itself, is particularly useful in making an electrical measurement in drill-holes because of the fact that when the measuring electrodes suspended on the lower end of the cable are positioned in the upper portion of the drill-hole, a large portion of the cable is wound upon a winch, whereas when the electrodes are positioned in the lower end of a hole substantially all of the cable may be unwound from the winch and suspended in a straight line in the hole. Thus, referring to Fig. 3, there is indicated schematically an apparatus with which my cable may be employed for making measurements in drill-holes. This apparatus comprises a winch 10 on which a cable 11 (which preferably corresponds in structure to the cable shown in Figs. 1 and 2), is adapted to be wound and unwound. At the lower end of cable 11 four of the individually insulated and shielded electrical conductors 12, 13, 14 and 15 (each corresponding to one of the conductors 3 in Fig. 2) are connected respectively to four electrodes 16, 17, 18 and 19, these electrodes being spaced longitudinally from each other at the lower end of the cable.

At the opposite end of the cable, the conductors 12, 13, 14 and 15 are connected, respectively, to four slip rings 20, 21, 22 and 23, respectively, which slip rings contact brushes 24, 25, 26 and 27, respectively, these brushes being connected to the testing apparatus.

As shown in Fig. 3, the testing apparatus comprises a Wheatstone bridge 28 having a source of alternating current 29 connected across two of its diagonals and having an indicating instrument 30 connected across the other pair of diagonals. One arm of the bridge 28 is constituted by the circuit including the brush 24, slip ring 20, cable conductor 12, electrode 16, the fluid in the drill-hole and the formation surrounding the drill-hole back to the electrode 17, thence through the conductor 13, the slip ring 21 and the brush 25 back to bridge 28. The other two electrodes 18 and 19, respectively, at the lower end of the cable are individually connected through cable conductors 14 and 15, respectively, the slip rings 22 and 23, respectively, and the brushes 26 and 27, respectively, to an indicating instrument 31.

The system disclosed in Fig. 3 is operated by rotating the winch 10 to wind or unwind the cable and raise or lower the electrodes 16, 17, 18 and 19 in the drill-hole, while observing the instruments 30 and 31 (it being understood, of course, that if desired these instruments 30 and 31 may be of the automatic recording type). As the electrodes traverse different formations the impedance of the circuit including the formation adjacent electrodes 16 and 17 varies, and likewise the variations in the electric field produced in the formation by current flowing between electrodes 16 and 17 create varying potentials on the electrodes 18 and 19. The varying impedances of the formations change the impedance between electrodes 16 and 17, thereby varying the degree of balance of the bridge 28 to produce indications on the meter 30. Likewise the varying field impressed on the electrodes 18 and 19 develops potentials in those electrodes which are applied to the cable conductors through the instrument 31 to produce variable readings in that instrument. It will be obvious, however, that the readings of the instruments 30 and 31 will not represent solely changes in the impedance of the formation traversed by the electrodes unless the electrical constants of the remainder of the circuit remain the same. Thus if the cable 11 were of a type in which the self-inductance of and the electrical coupling between the conductors varied as the cable was wound or unwound from the winch, then the readings of the instruments 30 and 31 will not be pure functions of the variations in the formation traversed but would also vary independently of changes in the formation by virtue of the changing impedance and coupling characteristics of the different cable conductors.

However, by employing as the cable 11 a cable construction of the type shown in Figs. 1 and 2, in which the inductance and electrical coupling of the different conductors remain substantially the same irrespective of whether the cable is coiled on a winch or suspended in a straight line, apparatus similar to that disclosed in Fig. 3 may be employed without introducing appreciable errors into the readings due to varying impedance characteristics of the cable.

It will be understood that in a cable construction as described, it is not essential that five individual elements 2 be employed. This number may be either increased or decreased depending upon the number of electrical conductors required for a particular purpose provided the keystoning effect is maintained. In practice, however, a five-conductor cable as disclosed has been found very satisfactory and may be employed even when fewer than five conductors are required, one or more conductors being held in reserve.

Patent 2,167,098, July 25, 1939, shows and describes a similar type of cable having a pronounced key-stoning effect which is a characteristic of my invention as disclosed in Figures 1 and 2 of the drawing. The strands are sufficiently few in number, but occupy the major diameter of the cable so as to produce this result. That is, the several strands tend to wedge one against the other and maintain their positions around the core. As the number of strands increase, and the strands occupy less than half the diameter of the cable, the key-stoning effect becomes less pronounced with the result the cable cannot be wound on conventional drums as the core tends to push through or separate the strands when the cable is repeatedly flexed.

Although the invention has been explained by describing in detail a specific embodiment thereof, various minor changes may be made in the exact construction described without departing from the invention, and the latter is to be limited only to the extent set forth in the appended claims.

I claim:

1. A multiple conductor cable adapted for use in the electrical exploration of oil wells which involves a repeated winding and unwinding of the cable from a winch, said cable comprising a flexible resilient impregnated non-conducting core, an outer wire rope structure comprising a plurality of abrasive resistant strands of high tensile strength helically wound on the core and occupying the major diameter of the cable to produce a pronounced key-stoning effect, and each strand of the outer wire rope structure including a central conductor, a layer of insulating material surrounding the same, and a metallic protecting and weight supporting armor surrounding the insulating material comprising a plurality of wires of a material which forms a magnetic shield for each individual conductor whereby the impedance characteristics of the cable is substantially the same throughout its length whenther wound or unwound.

2. A multiple conductor cable adapted for use in the electrical exploration of oil wells which involves a repeated winding and unwinding of the cable from a winch, said cable comprising a flexible core, an outer wire rope structure comprising a plurality of abrasive resistant strands of high tensile strength helically wound on the core and occupying the major diameter of the cable to produce a pronounced key-stoning effect, an insulated conductor within each outer strand, and a metallic sheathing for each of said strands formed of a continuous layer of steel wires, oppositely laid with respect to the lay of the strand, that support and armor the cable and substantially confine the magnetic field of each conductor to the space within the sheathing.

RAYMOND D. ELLIOTT.